United States Patent
Lander et al.

(10) Patent No.: US 9,098,317 B2
(45) Date of Patent: Aug. 4, 2015

(54) OPTIONAL RETARGETING OF LIBRARY REFERENCES

(75) Inventors: Richard E. Lander, Bellevue, WA (US); Michael Rayhelson, Seattle, WA (US); David M. Kean, Redmond, WA (US)

(73) Assignee: MICROSOFT TECHNOLOGY LICENSING LLC

(*) Notice: Subject to any disclaimer, the term of this patent is extended or adjusted under 35 U.S.C. 154(b) by 566 days.

(21) Appl. No.: 13/048,894

(22) Filed: Mar. 16, 2011

(65) Prior Publication Data
US 2012/0240106 A1   Sep. 20, 2012

(51) Int. Cl.
G06F 9/44    (2006.01)
G06F 9/445   (2006.01)

(52) U.S. Cl.
CPC ........ G06F 9/44521 (2013.01); G06F 9/44542 (2013.01)

(58) Field of Classification Search
None
See application file for complete search history.

(56) References Cited

U.S. PATENT DOCUMENTS

| | | | |
|---|---|---|---|
| 6,772,106 B1* | 8/2004 | Mahlke et al. ................ | 703/21 |
| 7,418,718 B2 | 8/2008 | Liu et al. | |
| 7,543,309 B2 | 6/2009 | Forin et al. | |
| 7,565,517 B1* | 7/2009 | Arbon .............................. | 713/1 |
| 2004/0154007 A1* | 8/2004 | Koizumi et al. ............. | 717/151 |
| 2004/0230967 A1* | 11/2004 | Yuknewicz et al. ........... | 717/170 |
| 2005/0091259 A1* | 4/2005 | Parthasarathy et al. ....... | 707/102 |
| 2005/0166196 A1* | 7/2005 | Grier et al. .................... | 717/162 |
| 2006/0037011 A1* | 2/2006 | Shi et al. ........................ | 717/164 |
| 2008/0134144 A1* | 6/2008 | Nathan et al. ................ | 717/121 |
| 2008/0320460 A1 | 12/2008 | Miller et al. | |
| 2011/0185346 A1* | 7/2011 | Andrade et al. ............. | 717/151 |
| 2012/0066699 A1* | 3/2012 | Kinkade et al. .............. | 719/331 |

OTHER PUBLICATIONS

"Retargetable Assemblies", Retrieved at << http://msdn.microsoft.com/en-us/library/dd560835.aspx >>, Retrieved Date: Dec. 27, 2010, pp. 1.
Buckley, Alex., "A Model of Dynamic Binding in .NET", Retrieved at << http://slurp.doc.ic.ac.uk/pubs/dynamicbindingindotnet-cd05.pdf >>, Conference or Workshop Paper Component Deployment, Nov. 2005, pp. 15.
"Assembly Binding Redirection", Retrieved at << http://msdn.microsoft.com/en-us/library/2fc472t2.aspx >>, Retrieved Date: Dec. 27, 2010, p. 1.

(Continued)

*Primary Examiner* — Insun Kang
(74) *Attorney, Agent, or Firm* — Kevin Sullivan; Kate Drakos; Micky Minhas

(57) ABSTRACT

Shared libraries and references within the shared libraries can be retargeted in accordance with optional transformation rules. The optional transformation rules can be applied differently for different binding contexts. For user-code scenarios, optional retargeting binding rules can be applied automatically by default without requiring any human intervention. Optional targeting that triggers automatic binding behaviors can be disabled based on heuristics. Alternatively, the user can specify in the code or in a configuration file if the source or target is to be loaded. Transformation rules can be disabled based on heuristics. A manual option permits a user to choose at runtime whether the transformation is to be applied, or not applied, in a late-bound fashion.

20 Claims, 4 Drawing Sheets

(56) References Cited

OTHER PUBLICATIONS

Matthew, Reynolds., "Runtime assembly binding redirection", Retrieved at <<http://weblogs.asp.net/mreynolds/archive/2003/07/9705.aspx >>, Jul. 4, 2003, p. 1.

Subramanian, Sridhar., "Dynamically Loading an assembly at Runtime and calling its methods", Retrieved at << http://www.c-sharpcorner.com/uploadfile/sridhar_subra/dynamicassemblymethod10132008214835pm/dynamicassemblymethod.aspx >>, Oct. 14, 2008, pp. 3.

* cited by examiner

OPTIONAL RETARGETING OF LIBRARY REFERENCES

BACKGROUND

A computing platform is a combination of hardware architecture and a software framework in which software runs. A platform can include a computer's architecture, operating system, available programming languages and related user interfaces. Often similar software runs on different computing platforms. For example, an application such as for example a Silverlight® application can run on a PC (personal computer), a Windows® Phone 7 and on a Macintosh computer without modification. All of these devices probably do not use the same operating system. For example, the mobile device may run Windows CE (Windows Embedded Compact or Windows Embedded CE), an operating system developed by Microsoft Corporation for minimalistic computers, mobile devices and embedded systems. The PC may run Windows 7, an operating system developed by Microsoft Corporation for full-service desktop and laptop computers while the Macintosh computer may run Mac OS X. In addition to being able to run on different devices with different operating systems, an application may be expected to run in different software frameworks. A software framework is a type of program code library that abstracts platform-specific functionality so that it can be used in a generic manner, and can be selectively overridden or specialized by user code to provide a specific functionality. For example, Silverlight is an application framework created by Microsoft Corporation for writing and running Internet applications.

Portability refers to the feasibility of using code created for one platform and running it on another platform instead of creating new code for the second platform. Generally, in order for software to be portable, application logic has to be abstracted from system interfaces. When targeting several platforms with the same application, portability can translate to development cost and time-to-market reductions.

SUMMARY

An application designed to run on one computing platform can be retargeted to run on another computing platform via system-mandated retargeting policy. In addition, such an application can opt out of retargeting by disabling system-mandated retargeting. Retargeting typically involves binding a library to a particular and consistent implementation of a framework as a means of resolving its dependencies. A library such as but not limited to a class library or executable can be bound to a specific implementation or version of a shared library (such as but not limited to a DLL, dynamic link library). In virtual machine environments, at runtime, a virtual machine can determine that a dependency can be retargeted, and can resolve the dependency to the correct implementation for the current environment.

Shared libraries and references within the shared libraries can be retargeted in accordance with optional transformation rules. Optional transformation rules enable those transformations to be applied, or not applied, depending on a set of criteria, including the nature of the binding context itself. The optional transformation rules can be different for different binding contexts. For user-code scenarios, optional retargeting rules for binding behavior can be applied automatically by default without requiring any human, (e.g., application or library developer or designer) intervention. System-mandated binding policy that triggers automatic binding behaviors can be disabled based on heuristics. Alternatively, the user can manually specify binding behaviors either in the program code itself, or by configuration settings that disable the system-mandated binding policy. Binding behaviors can be used by a binding context to determine how a dependency should be transformed with respect to optional transformation rules. Binding behaviors can determine if the version of code used in the source or if the version of code used in the target is to be loaded into the loader context and bound to the retargeted software. For example, if binding behaviors show a strong relationship to the source of an optional transformation rule rather than the target, then an implementation may not apply the optional transformation rules.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1:
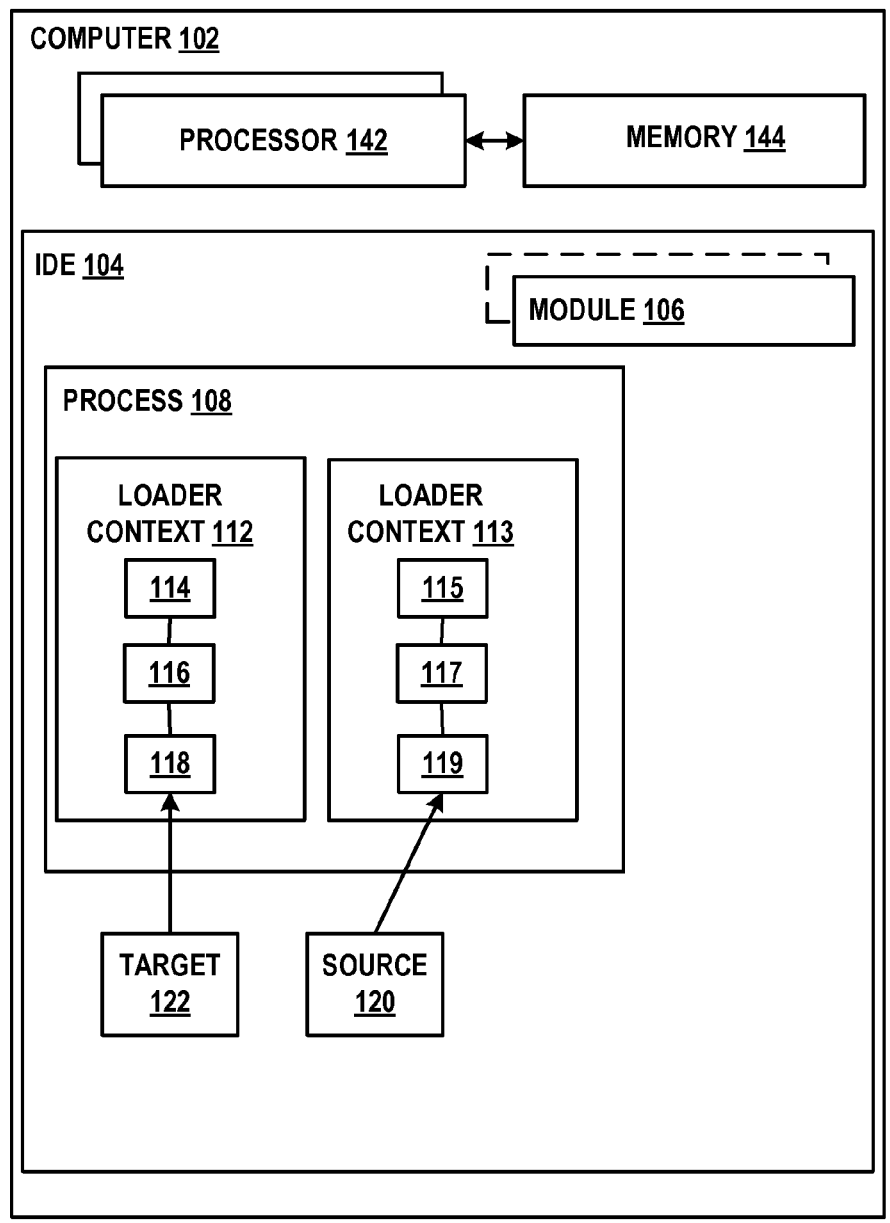
FIG. 1 illustrates an example of a system 100 that optionally retargets code library references in accordance with aspects of the subject matter disclosed herein.

In traditional compilation, a static linker is used by a compiler to generate an executable file. Dynamic checks are not needed to resolve external dependencies. In contrast, in a virtual machine environment such as a Java Virtual Machine or Microsoft® .NET Common Language Runtime (CLR), the bytecode for a class can start to execute and classes from the execution environment can be loaded and linked as needed as execution continues. A library can enumerate the classes it provides and its dependencies, including the names of other libraries whose classes it uses. The resolution of a library includes converting a bytecode's reference to a library name into a physical location where the library resides. References to libraries compiled for other platforms can also be resolved.

In most virtual machine environments, the identifier for a library is its filename. An application's dependency is resolved to a filename. A library can also have a logical identity (e.g., a library name) that can include a name, a version number, a cultural identifier and a public key. Libraries can be placed at a standard location on disk or other storage media. At load time this standard location can be checked first and can provide the default environment from which libraries are loaded. The state of the runtime system can be represented by an environment, a heap and a stack. The heap can store library definitions loaded from the environment and can comprise one or more contexts. A library loaded by the runtime system can be placed in a default library binding context. Libraries loaded directly from a file name can be placed in a second binding context. The binding context of a currently executing library can affect the resolution of a reference to another library. When an instruction is evaluated, in which context a reference is searched for depends on which context the currently executing library is loaded in. References of a currently executing library can be consulted when a reference to another library is resolved.

The term "binding" refers to resolving and loading libraries. In accordance with aspects of the subject matter disclosed herein, a binding context can include a set of rules on how dependencies are to be resolved. It can also include a set of rules that transform the nature of dependencies as part of resolution. Optional retargeting rules are rules that can be enacted or not enacted, based on established criteria. Different library binding rules can be applied. Optional transformation rules enable those transformations to be applied, or not applied, depending on a set of criteria, including the nature of the binding context itself. A module or modules comprising a library binder can determine based on criteria whether the retargeting rule is applied or is not applied. Alternatively, the library binder can be informed by user code or by configuration settings, whether the retargeting rule is to be applied or if the retargeting rule is not to be applied.

Criteria that are considered to determine whether the optional retargeting rule is to be applied are not mutually exclusive, so that multiple criteria can be applied within the same process at one time. Considered criteria include differentiated optional retargeting by binding context. Optional retargeting rules can be applied differently in different binding contexts. An optional retargeting rule can be applied or not applied based on whether the running software in the current context comprises a user application or an application development environment or other kind of tool (e.g., a programming development tool). For example, a user application typically will not attempt to disable system policy, whereas a tool will typically disable system policy. Different binding behaviors include automatic binding behavior for user code or consumer scenarios. For typical user-code scenarios, optional retargeting binding rules are applied automatically by default. Developer intervention is not needed. This behavior can keep an application correctly configured with respect to assembly binding behavior. Another binding behavior can disable optional retargeting via a heuristic instead of by using an explicit opt-out mechanism. For example, when library references match the source (rather than the target) of a retargeting rule used for resolving portable references, then the retargeting rule can be automatically disabled. Cases in which the automatic behavior is applied include but are not limited to applications and some developer programming tools.

Manual binding behavior can be applied in certain scenarios, determined by binding context. When such a scenario occurs, user (e.g., developer) input can be solicited to determine whether the source or target of the retargeting rule is loaded into the loader context. User input is solicited to determine how the optional retargeting rule is to be applied. User response can be repeatedly requested (e.g., user response is not persisted) to provide comprehensive user control of library binding behavior with respect to the retargeting rule. System-mandated binding policy is owned and maintained by the system (e.g., by the .NET CLR) and is automatically applied unless disabled as described above. Binding behavior is not otherwise configurable by users.

Optional Retargeting of Library References

FIG. 1 illustrates an example of a system 100 for optional retargeting of code library references in accordance with aspects of the subject matter disclosed herein. All or portions of system 100 may reside on one or more computers such as the computers described below with respect to FIG. 3. System 100 or portions thereof may be provided as a stand-alone system or as a plug-in or add-in. System 100 may execute on a software development computer such as the software development computer described with respect to FIG. 4. System 100 may execute within an integrated development environment (IDE) such as IDE 104, described more fully with respect to FIG. 4. All or portions of system 100 may be implemented as a plug-in or add-on.

System 100 may include one or more of: a computer 102 comprising: one or more processors such as processor 142, etc., a memory such as memory 144, and one or more modules such as module 106, etc. for optional retargeting of code library references as described herein. Other components well known in the arts may also be included but are not here shown. It will be appreciated that one or more modules such as module 106, etc. can be loaded into memory 144 to cause one or more processors such as processor 142 to perform the actions attributed to the one or more modules for optional retargeting of code library references.

One or more processes such as process 108, etc. may execute on system 100. Process 108 may execute within an IDE such as IDE 104 or process 108 can execute outside of an IDE. Contemplated IDE's include Microsoft's Visual Studio®, Microsoft's Expression Blend®, SharpDevelop, Xac-c.ide, MonoDevelop and so on, or any other IDE. Process 108 can include a loader context such as loader context 112. Loader context 112 can represent a default context for user-code scenarios or for scenarios in which default binding behavior is desired. For user-code scenarios, optional retargeting binding rules can be applied automatically by default. In accordance with some aspects of the subject matter disclosed herein, no developer intervention is needed for the retargeting rules to be applied so that the user code application remains correctly configured. Loader context 112 can include one or more libraries such as library 114. Library 114 may have one or more dependencies such as for example, library 116. Library 116 may have one or more dependencies such as for example library 118. That is, loader context 112 can include a first library, e.g., library 114 that references a second library, e.g., library 116. Library 116 in turn can reference library 118. It will be appreciated that while two levels of dependencies are illustrated, any level of dependencies can be involved. The bottommost library, library 118 in FIG. 1 can represent a platform-specific library that is used to resolve a portable reference. As one possible example, library 118 may represent a platform-specific library for a desktop application when the retargeting source is a mobile device application and the retargeting target is the desktop application.

Process 108 can also include a second loader context such as loader context 113. Loader context 113 can represent a context for scenarios in which the default binding behavior is not desired and instead an alternate behavior is desired. Loader context 113 can represent a binding context for loading add-ins in which optional retargeting can be automatically disabled via a heuristic. In some cases, automatic binding behavior as described above can be disabled when libraries that match the source 120 rather than the target 122 are to be used. Other heuristics are contemplated. Examples include but are not limited to the following. A library loader may detect that an assembly already loaded in the binding context matched either the source or target of an optional transformation rule. A library loader may detect other loaded or unloaded library references associated with an application and determine whether those references matched either the source or target of an optional transformation rule. Automatically disabling the retargeting rule leaves the source unchanged without requiring the user to select an opt-out option. Cases in which a user such as a developer would want to disable the automatic behavior are typically a known finite set and can be coded into the heuristics. Loader context 113 can represent an advanced scenario in which a user such as a developer writes code in which the user manually controls loading of the source or target of the retargeting rule, enabling the user to have comprehensive control of the binding behavior.

Loader context 113 can include a first library, e.g., library 115 that references a second library such as library 117. Library 117 can reference a third library such as library 119. It will be appreciated that while two levels of dependencies are illustrated, any level of dependencies can be involved. The bottommost library, library 119 in FIG. 1 can represent a portable platform library. As one possible example library 119 can be a platform-specific library for a mobile device application when the retargeting source is a mobile device application and the retargeting target is the desktop application.

Figure 2:
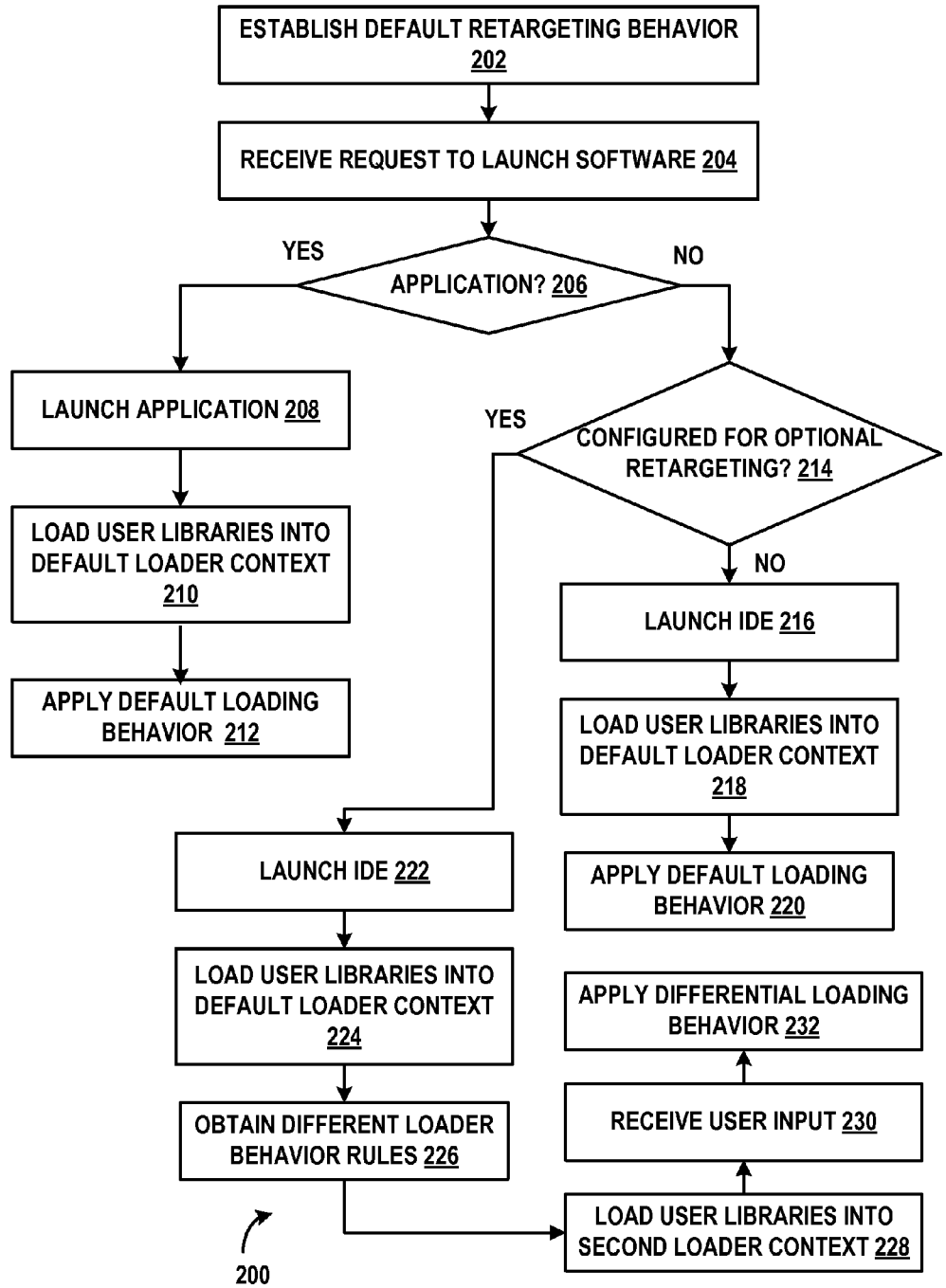
FIG. 2 is a flow diagram of an example of a method 200 that optionally retargets code library references in accordance with aspects of the subject matter disclosed herein.

FIG. 2 illustrates an example of a method 200 for optional retargeting of library references. The method described in FIG. 2 can be practiced by a system such as but not limited to the one described with respect to FIG. 1. Some of the actions described below can be optional. Some of the actions described below can be executed in a sequence that differs from that described below.

At 202 default retargeting behavior can be established. In accordance with some aspects of the subject matter described herein, default retargeting behavior can replace platform-specific references in the source with the target platform-specific references. At 204 a request to launch software can be received. At 206, in response to determining the software launched is an application, the application can be launched at 208. At 210 the user libraries can be loaded into the default loader context. At 212 the default loading behavior can be applied to the portable references in the application code. At 206, in response to determining that the software launched is an IDE tool processing can continue at 214. At 214 in response to determining that the IDE has not been configured for optional retargeting, the IDE can be launched at 216 and at 218 the IDE can load user libraries into the default loader content. At 220 the default retargeting behavior can be applied to the portable references. At 214 in response to determining that the IDE has been configured for optional retargeting, the configured IDE can be launched at 222. At 224 the IDE can load user assemblies into the default loader context. At 226 different loading behavior rules can be obtained, as directed by the configuration information. At 228 the IDE can load user assemblies into a second context (called herein the anonymous context). At 230 user input providing manual control over how portable references are resolved can be received. At 232 the differential loader behavior can be applied to the portable libraries.

Example of a Suitable Computing Environment

Figure 3:
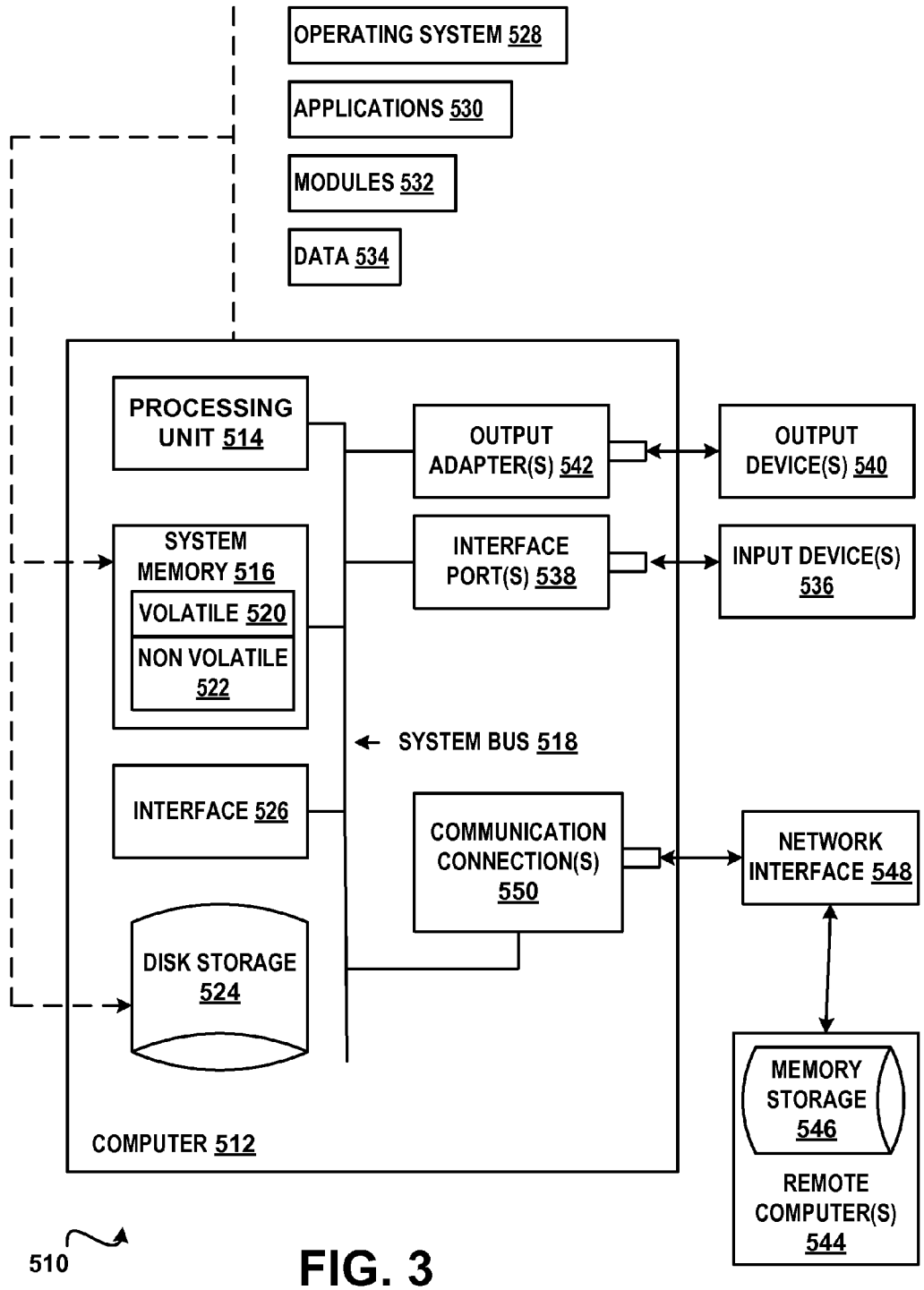
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other transitory or non-transitory medium which can be used to store the desired information and which can be accessed by computer 512.

It will be appreciated that FIG. 3 describes software that can act as an intermediary between users and computer resources. This software may include an operating system 528 which can be stored on disk storage 524, and which can allocate resources of the computer system 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
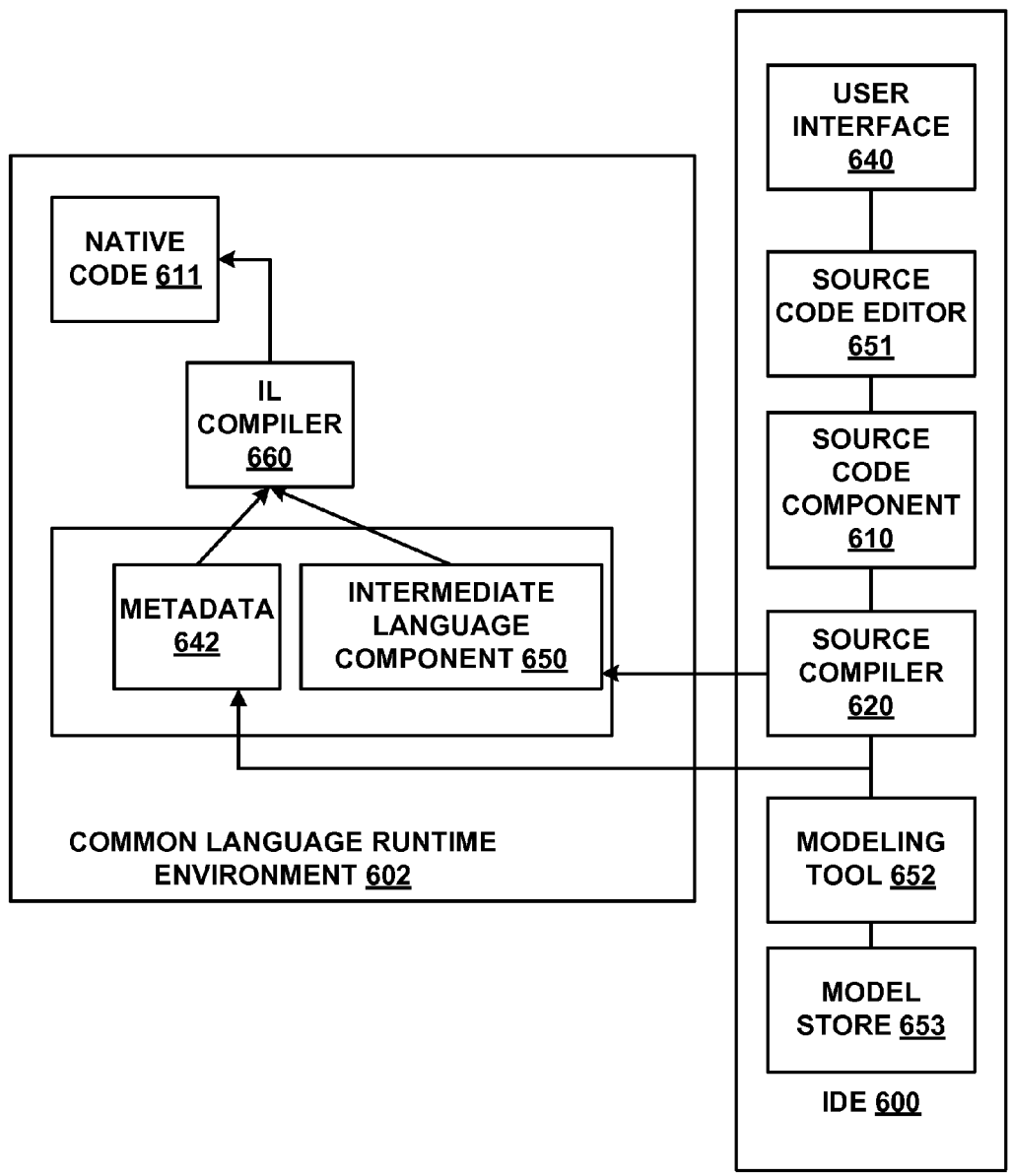
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
    at least one processor and a memory of a computing device; and
    at least one module on the computing device configured to cause the at least one processor of the computing device to:
    provide a plurality of binding behaviors, the plurality of binding behaviors including a default binding behavior, a specific binding behavior, and a user-specified binding behavior;
    retarget software written to execute on a first computing platform to software that is written to execute on a second computing platform by applying at least one of the plurality of binding behaviors based on a context of the software, the context of the software comprising user code or a programming development tool;
    wherein the default binding behavior is based on an automatic system mandated binding policy, the specific binding behavior is based on one or more transformation rules applied automatically, and the user-specified binding behavior is specified in code or in configuration settings,
wherein a binding behavior determines which code is to be loaded into a loader context and bound to the retargeted software, and
wherein the first computing platform and the second computing platform have different types of operating systems.

2. The system of claim 1, wherein the binding behavior is based on a loader context by:
creating a first loader context wherein the default binding behavior is applied automatically without user intervention to the retargeted software; and
creating a second loader context wherein automatic binding of the retargeted software is disabled.

3. The system of claim 1, wherein the one or more transformation rules are applied based on whether the software is an application, a programming development tool, or an application development environment.

4. The system of claim 1, wherein the specific binding behavior is based on a binding context, the binding context comprising a set of rules determining how dependencies are to be resolved.

5. The system of claim 1, wherein the at least one module on the computing device is further configured to cause the at least one processor of the computing device to:
disable the default binding behavior when the user-specified behavior or the specific binding behavior is applied to the retargeted software.

6. The system of claim 1, wherein the default binding behavior replaces a version of code used for the first computing platform, the first computing platform comprising a source platform, with a version of code used in the second computing platform, the second computing platform comprising a target platform for the retargeted software.

7. The system of claim 1, wherein the user-specified binding behavior uses a version of code used for the first computing platform for the retargeted software.

8. The system of claim 1, wherein the user-specified binding behavior specifies that a version of code used for the retargeted software is the version of code used in the second computing platform.

9. A method comprising:
loading software into a first loader context, the first loader context applying a system-mandated binding policy for a portable reference, the software comprising a plurality of libraries, at least one of the plurality of libraries comprising a reference to a portable library, the portable reference configured to run on more than one computing platform, the portable library configured to run on more than one computing platform;
obtaining a plurality of binding behaviors, wherein each of the plurality of binding behaviors is applied based on a context of the software, the context including user code or a programming development tool; and
loading the plurality of libraries into a second loader context, the second loader context disabling the system-mandated automatic binding policy and applying a binding behavior of at least one of the plurality of binding behaviors,
the plurality of binding behaviors including one or more transformation rules that apply a specific binding behavior based on heuristics and one or more user-specified binding behaviors provided in code.

10. The method of claim 9, wherein the first loader context is a programming tool of an integrated development environment, automatically configuring the binding behavior for retargeting.

11. The method of claim 9, wherein the software comprises a programming tool of an integrated development environment and wherein the integrated development environment is configured for retargeting.

12. The method of claim 9, wherein the one or more user-specified binding behaviors is based on user input specifying a desired binding behavior.

13. The method of claim 12, wherein the user input is provided by configuration settings.

14. The method of claim 9, wherein the one or more transformation rules are applied based on whether the software is an application, a programming development tool, or an application development environment.

15. A computer-readable hardware storage device comprising computer-executable instructions which when executed cause at least one processor of a computing device to:
apply binding rules for resolving portable references when generating code targeting a second computer platform from code written to execute on a first computer platform by:
determining a context of the code, the context comprising user code or a development programming tool;
creating a first loader context, the first loader context associated with an automatic system-mandated binding policy that applies default binding rules when a portable reference is resolved to a library of a target computer platform;
creating a second loader context, wherein the second loader context disables the automatic system-mandated binding policy and triggers application of user-specified binding rules or application of specific binding rules based on the context of the code, the specific binding behavior is based on one or more transformation rules and the user-specified binding behavior is specified in code; and
differentially applying one of the user-specified binding rules or the specific binding rules to a retargeted software,
wherein a portable reference is configured to run on more than one computer platform.

16. The computer-readable storage device of claim 15, comprising further computer-executable instructions, which when executed cause the at least one processor to:
automatically disable the default binding rules based on a loader context in which a program is executing.

17. The computer-readable storage device of claim 15 wherein the one or more transformation rules are applied based on whether the software is an application, a programming development tool, or an application development environment.

18. The computer-readable storage device of claim 15, comprising further computer-executable instructions, which when executed cause the at least one processor to:
receive the user-specified binding rules in configuration settings.

19. The computer-readable storage device of claim 15, comprising further computer-executable instructions, which when executed cause at least one processor to:
replace a version of code bound to the retargeted software with the version of code used in the first computer platform.

20. The computer-readable storage device of claim 16, comprising further computer-executable instructions, which when executed cause at least one processor to:
  replace a version of code bound to the retargeted software with a version of code used in the second computer platform.

* * * * *